United States Patent
Bagepalli et al.

[19]

[11] Patent Number: 6,030,175

[45] Date of Patent: Feb. 29, 2000

[54] HYBRID SEAL AND ROTARY MACHINE CONTAINING SUCH HYBRID SEAL

[75] Inventors: Bharat Sampathkumaran Bagepalli, Niskayuna; Norman Arnold Turnquist, Cobleskill; David Robert Skinner, Pattersonville, all of N.Y.

[73] Assignee: General Electric Company, Schenectady, N.Y.

[21] Appl. No.: 09/159,196

[22] Filed: Sep. 23, 1998

[51] Int. Cl.[7] .................................................. F01D 11/02
[52] U.S. Cl. .................... 415/173.3; 415/173.5; 415/174.5; 415/174.2; 415/230; 415/231; 277/355; 277/416; 277/421
[58] Field of Search .............................. 415/173.5, 174.5, 415/230, 231, 173.3, 174.2; 277/355, 412, 416, 419, 421, 422

[56] References Cited

U.S. PATENT DOCUMENTS

| | | | |
|---|---|---|---|
| 5,613,829 | 3/1997 | Wolfe et al. | 415/174.1 |
| 5,749,584 | 5/1998 | Skinner et al. | 277/53 |

FOREIGN PATENT DOCUMENTS

| | | |
|---|---|---|
| 0816726 | 1/1998 | European Pat. Off. . |
| 0911554 | 4/1999 | European Pat. Off. . |

OTHER PUBLICATIONS

WO 99/30065, Ingistov, Turbine Power Plant Having Minimal–Contact Brush Seal Augmented Labyrinth seal, Jun. 1999.

Application entitled, "Seal Assembly and Rotary Machine Containing Such Seal Assembly", Turnquist et al., Serial No. 09/131,486, filed Aug. 10, 1998.

Application entitled, "Brush Seal Segment", Turnquist et al., Serial No. 09/131,485, filed Aug. 10, 1998.

Application entitled, "Brush Seal and Rotary Machine Containing Such Brush Seal", Zhou, Serial No. 09/139,869, Aug. 25, 1998.

"Brush Seals in Industrial Gas Turbines", by Wolfe et al., AIAA–97–2730, Jul. 6–9, 1997. pp. 1–7.

*Primary Examiner*—Edward K. Look
*Assistant Examiner*—Ninh Nguyen
*Attorney, Agent, or Firm*—Douglas E. Erickson; Marvin Snyder

[57] ABSTRACT

A hybrid seal segment and a rotary machine (such as a steam or gas turbine) containing such hybrid seal segment. The machine has a rotor, a stator casing, and the hybrid seal segment. The annular hybrid seal segment has a circumferentially-extending channel between axially-spaced-apart first and second labyrinth-seal segments which are attached to a radially-outwardly located mounting block which is circumferentially offset from the labyrinth-seal segments. A brush-seal segment is positioned in the channel.

20 Claims, 4 Drawing Sheets

6,030,175

HYBRID SEAL AND ROTARY MACHINE CONTAINING SUCH HYBRID SEAL

FIELD OF THE INVENTION

The present invention relates generally to seals, and more particularly to a hybrid labyrinth-brush seal for a rotary machine.

BACKGROUND OF THE INVENTION

Rotary machines include, without limitation, turbines for steam turbines and compressors and turbines for gas turbines. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

Hybrid labyrinth-brush seals have been proposed for use between a rotor and a surrounding casing in gas and steam turbines. The annular hybrid seal includes circumferentially-arrayed hybrid seal segments positioned in a circumferential groove in the casing. Each hybrid seal segment has the shape of generally an annular segment of a circular ring. One or more of the rows of radially-inwardly-projecting and circumferentially-extending stainless-steel labyrinth-seal teeth are replaced with brush-seal bristles. The teeth of a labyrinth seal segment of a labyrinth seal have radially-cut circumferential ends, and the bristles of a brush seal segment of a brush seal are canted at typically a forty-five degree angle with respect to a radius line. For a hybrid labyrinth-brush seal segment, making the circumferential ends of the tooth portion of a seal segment have a forty-five degree cant angle to match the bristles will create teeth with very sharp circumferential ends which creates a safety hazard to persons installing or replacing the seal segments. For a hybrid labyrinth-brush seal segment, trimming the circumferential ends of the angled bristle portion of a seal segment to prevent the bristles from circumferentially extending beyond the radially-cut circumferential ends of the tooth portion of a seal segment will leave a short circumferential region of the seal segment without any bristles contacting the rotor resulting in increased seal leakage.

SUMMARY OF THE INVENTION

In a first embodiment, a hybrid seal segment of the invention includes first and second labyrinth-seal segments, a mounting block, and a brush-seal segment. The first labyrinth-seal segment has a shape of generally an annular segment of a circular ring, has a longitudinal axis, and includes at least one radially-inwardly-projecting and circumferentially-extending tooth. The second labyrinth-seal segment has a shape of generally an annular segment of a circular ring, is generally coaxially-aligned with and axially spaced apart from the first labyrinth-seal segment, and includes at least one radially-inwardly-projecting and circumferentially-extending tooth. The first and second labyrinth-seal segments axially bound a circumferentially-extending channel therebetween. The mounting block is positioned radially-outward from and attached to the first and second labyrinth-seal segments radially-outwardly bounding a circumferential portion of the channel. The mounting block has opposing first and second circumferential ends. The first circumferential end of the mounting block extends circumferentially beyond the first and second labyrinth-seal segments, and the first and second labyrinth-seal segments extend circumferentially beyond the second circumferential end of the mounting block. The brush-seal segment has a shape of generally an annular segment of a circular ring and is generally coaxially aligned with the first and second labyrinth-seal segments. The brush-seal segment has inwardly-extending bristles, and the brush-seal segment is positioned in the channel. In one example, the first and second labyrinth-seal segments each have generally-radially-aligned circumferential ends, and each of the bristles of the brush-seal segment is aligned at generally a forty-five degree angle to a local radius line which extends from the longitudinal axis to the bristle.

In a second embodiment, a rotary machine of the invention includes a rotor, a casing, and circumferentially-arrayed hybrid seal segments The rotor has a longitudinal axis. The casing is generally coaxially aligned with the axis, circumferentially surrounds and is radially spaced apart from the rotor, and includes an inner circumferential groove generally coaxially aligned with and open to the rotor. Each hybrid seal segment is identical to the hybrid seal segment described in the previous paragraph for the first embodiment. The mounting block of each hybrid seal segment has a radially outer portion which is engaged in the groove of the stator. The first circumferential end of the mounting block of one of two circumferentially-adjacent hybrid seal segments circumferentially overlaps a portion of the first and second labyrinth-seal segments of the other of the two circumferentially-adjacent hybrid seal segments and is circumferentially proximate the second circumferential end of the mounting block of the other of the two circumferentially-adjacent hybrid seal segments.

Several benefits and advantages are derived from the invention. The unique design of the hybrid seal segment of the invention allows the circumferential ends of the tooth portion of a seal segment to be radially cut which prevents the teeth from having sharp circumferential ends thus avoiding a safety hazard to persons installing or replacing the seal segments. At the same time, the unique design of the hybrid seal segment of the invention allows the bristle portion of the seal segment to be canted at a forty-five degree angle from the local radius which prevents the creation of a short circumferential region of the seal segment without any bristles contacting the rotor, thus preventing increased seal leakage.

DETAILED DESCRIPTION OF THE INVENTION

Figure 1:
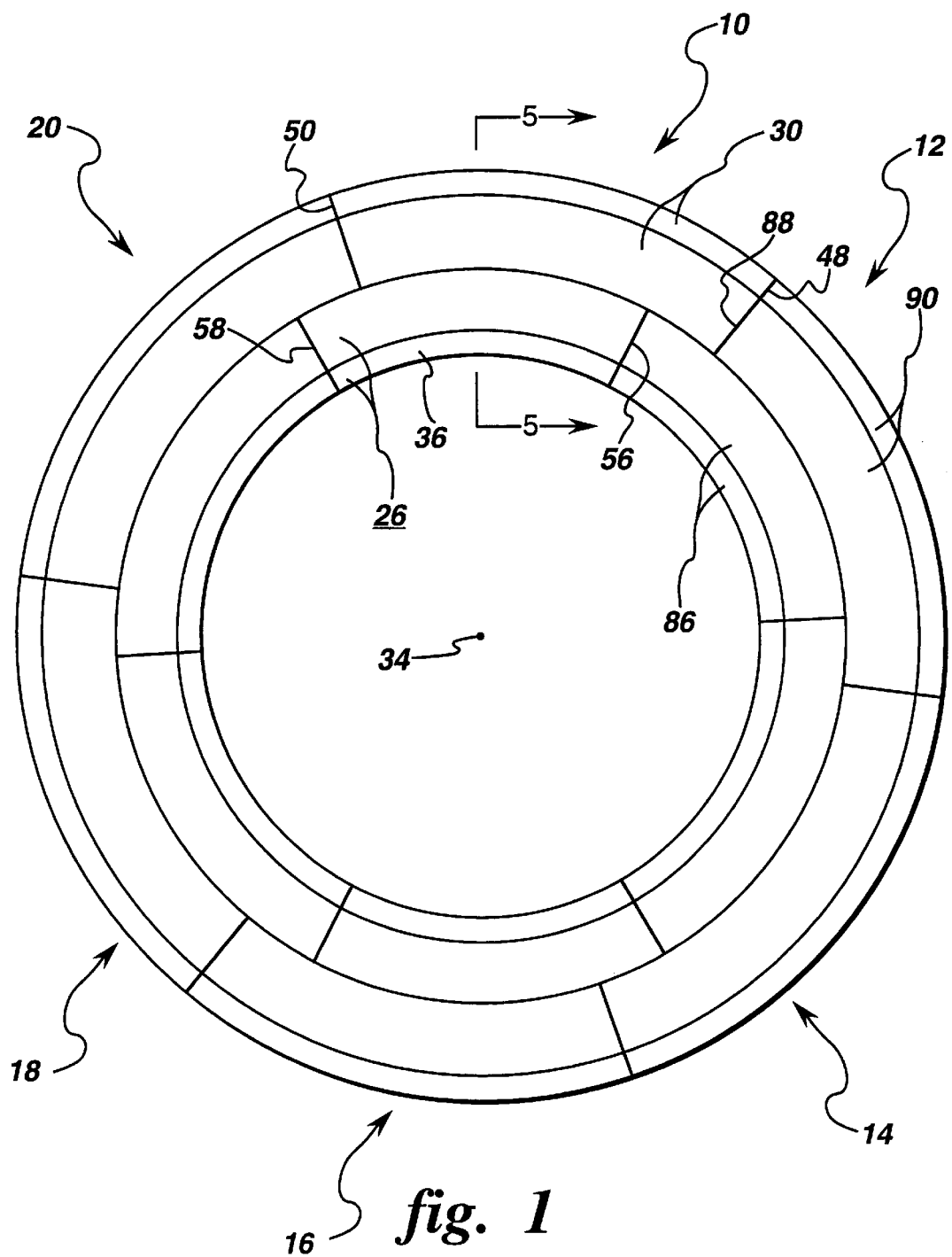
FIG. 1 is a schematic upstream-facing view of an embodiment of a hybrid seal segment of the invention shown circumferentially arrayed with other identical hybrid seal segments to define a hybrid seal.
Figure 2:
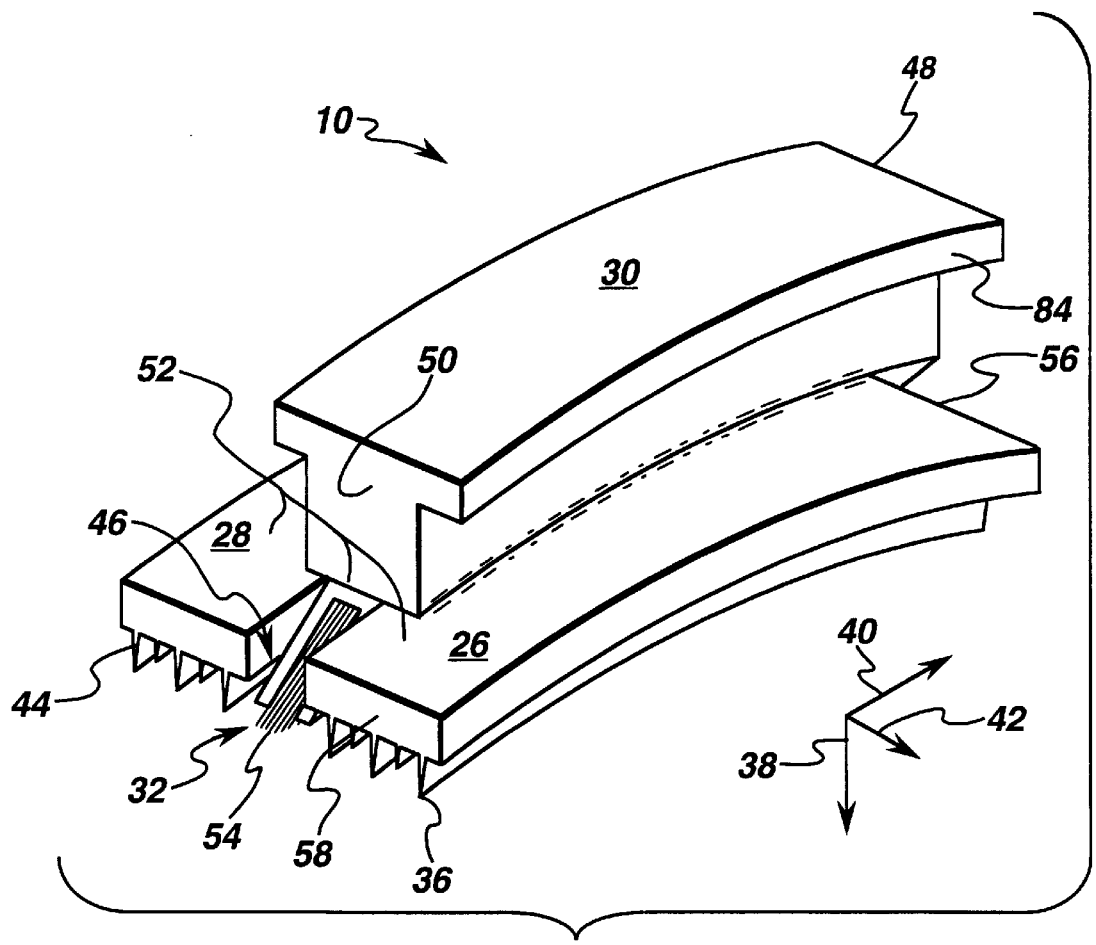
FIG. 2 is a schematic perspective view of one of the hybrid seal segments of FIG. 1 shown together with the axes of a reference coordinate system.
Figure 3:
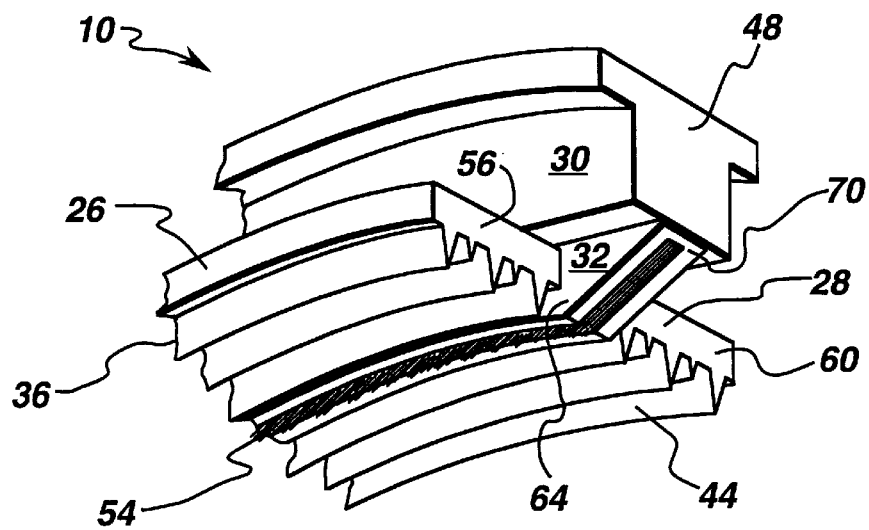
FIG. 3 is another perspective view of a portion of the hybrid seal segment of FIG. 2 more clearly showing an axially-tapered circumferential end of the brush-seal segment.
Figure 4:
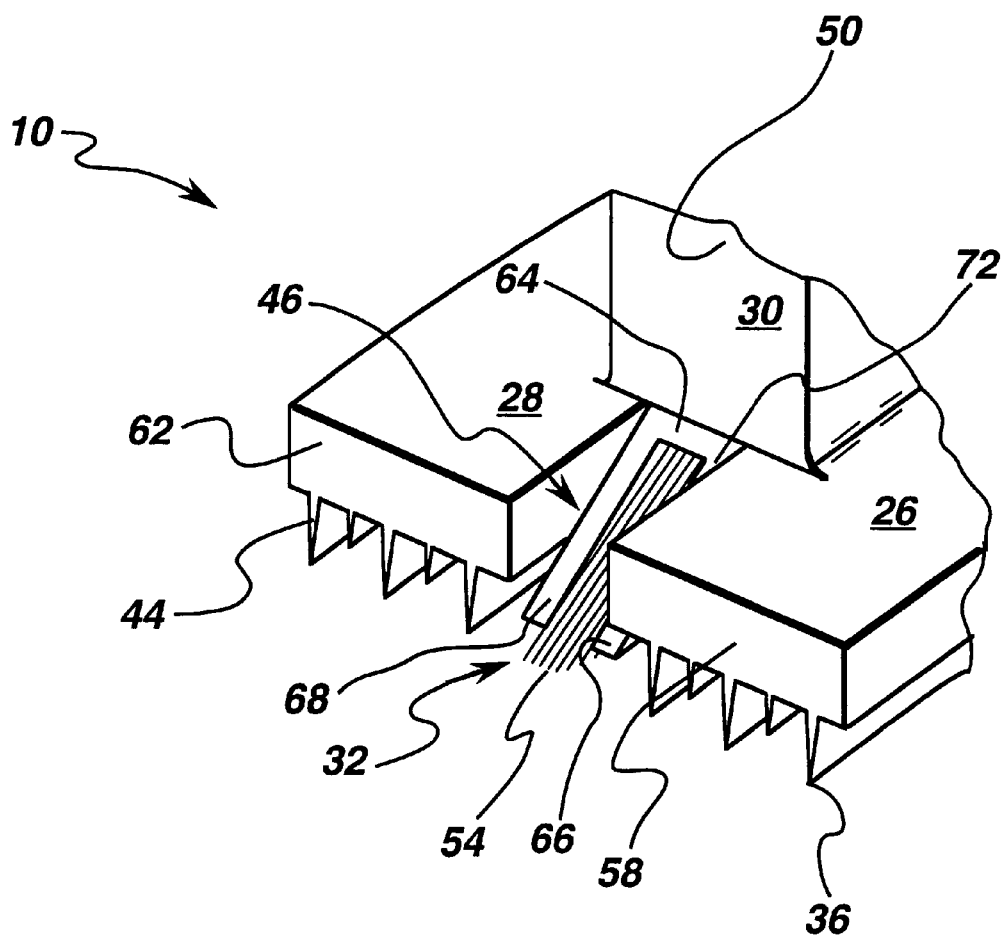
FIG. 4 is another perspective view of a portion of the hybrid seal segment of FIG. 2 more clearly showing the axial widening of the channel with increasing radial distance.
Figure 5:
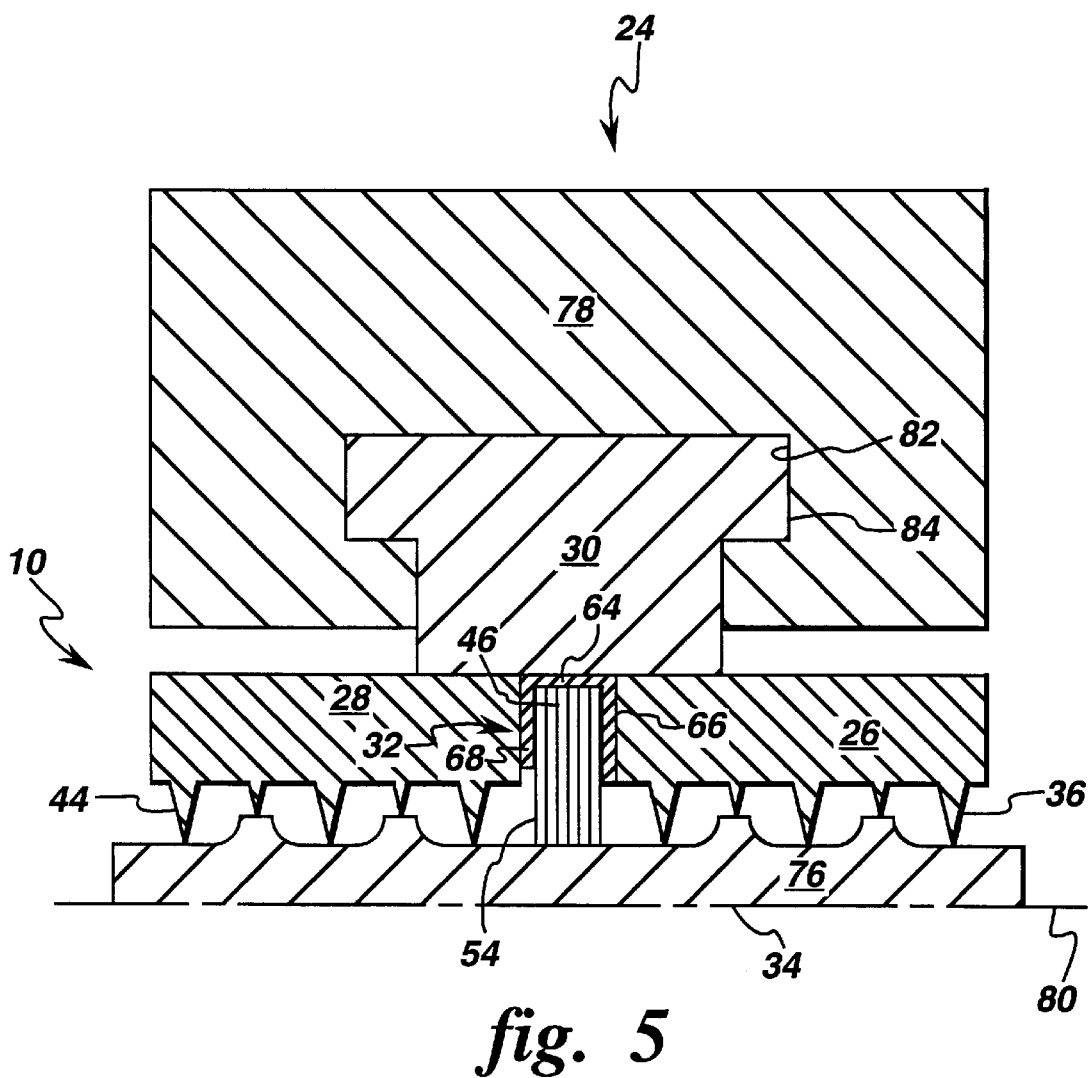
FIG. 5 is a cross-sectional view of the hybrid seal segment of FIG. 2 shown together with portions of a rotor and a stator casing of an embodiment of a rotary machine of the invention, wherein such cross-sectional view is taken along lines 5—5 of FIG. 1.

Referring now to the drawings, FIG. 1 schematically shows an embodiment of a hybrid seal segment 10 of the present invention together with five other generally identical hybrid seal segments 12, 14, 16,18, and 20 all circumferentially arrayed to define an annular hybrid seal 22. FIGS. 2–4 show different perspective views of the hybrid seal segment 10 or a portion thereof. FIG. 5 schematically shows a portion of an embodiment of a rotary machine 24 of the present invention containing installed hybrid seal segment 10. Examples of rotary machines include, without limitation, a steam turbine (including, together or individually, high, intermediate, and low pressure turbine sections) and a gas turbine (including, together or individually, compressors, and high and low pressure turbines).

The hybrid seal segment 10 of the present invention includes a first labyrinth-seal segment 26, a second labyrinth-seal segment 28, a mounting block 30, and a brush-seal segment 32. The first labyrinth-seal segment 26 has a shape of generally an annular segment of a circular ring, has a longitudinal axis 34, and has at least one radially-inwardly-projecting and circumferentially-extending tooth 36. For reference purposes, the axes of a cylindrical coordinate system are shown in FIG. 2, wherein the radial axis 38 is shown pointing radially inward toward the longitudinal axis 34 (such longitudinal axis 34 shown only in FIGS. 1 and 5), wherein the tangential axis 40 is shown pointing in a local circumferential direction, and wherein the axial axis 42 is oriented parallel to the longitudinal axis 34 and is shown pointing in a downstream direction. The second labyrinth-seal segment 28 has a shape of generally an annular segment of a circular ring, is generally coaxially-aligned with and axially spaced apart from the first labyrinth-seal segment 26, and has at least one radially-inwardly-projecting and circumferentially-extending tooth 44. The first and second labyrinth-seal segments 26 and 28 axially bound a circumferentially-extending channel 46 therebetween.

The mounting block 30 is disposed radially-outward from, and is attached to, the first and second labyrinth-seal segments 26 and 28 radially-outwardly bounding a circumferential portion of the channel 46. The mounting block 30 has opposing first and second circumferential ends 48 and 50. The first circumferential end 48 of the mounting block 30 extends circumferentially beyond the first and second labyrinth-seal segments 26 and 28, and the first and second labyrinth-seal segments 26 and 28 extend circumferentially beyond the second circumferential end 50 of the mounting block 30. In one example, the first and second labyrinth-seal segments 26 and 28 and the mounting block 30 define a monolithic member 52 such as a machined piece of stainless steel. In another example, the mounting block is a separate piece welded to the first and second labyrinth-seal segments.

The brush-seal segment 32 has a shape of generally an annular segment of a circular ring, is generally coaxially aligned with the first and second labyrinth-seal segments 26 and 28, and has inwardly-extending bristles 54. The bristles 54 typically consist essentially of metal-wire or ceramic-wire bristles such as, but not limited to, cobalt-based-alloy wire bristles. The brush-seal segment 32 is disposed in the channel 46. In one example, the brush-seal segment 32 is welded to the monolithic member 52.

In a preferred, but not necessary, construction, the first and second labyrinth-seal segments 26 and 28 have generally the same inner and outer radii and have generally the same circumferential length. Here, the first circumferential end 48 of the mounting block 30 extends a generally equal circumferential distance beyond the first and second labyrinth-seal segments 26 and 28, and the first and second labyrinth-seal segments 26 and 28 extend this equal circumferential distance beyond the second circumferential end 50 of the mounting block 30. In this construction, the first and second labyrinth-seal segments 26 and 28 have generally-radially-aligned circumferential ends 56, 58, 60, and 62 meaning that each circumferential end is generally parallel to a local radius line which extends from the longitudinal axis 34 to that circumferential end. Also, in this construction, each of the bristles 54 of the brush-seal segment 32 is aligned at generally a forty-five degree angle to a local radius line which extends from the longitudinal axis 34 to that bristle. The brush-seal segment 32 includes a bristle holder 64 which preferably, but not necessarily, has a backing plate 66 and an upstream plate 68 with the bristles 54 disposed axially between the backing and upstream plates 66 and 68.

In one assembly sequence, the brush-seal segment 32 is inserted in a circumferential direction into the channel 46. In another assembly sequence, the brush-seal segment 32 is inserted in a radially-outward direction into the channel 46. For ease of assembly in some assembly sequences, it is preferred, but not necessary, that the brush-seal segment 32 have an axially-tapered circumferential end 70 or 72 and/or that the channel 46 proximate the second circumferential end 50 of the mounting block 30 axially widens with increasing radial distance from the longitudinal axis 34, as seen most clearly in FIG. 4.

The rotary machine 24 of the present invention, as seen in FIG. 5, includes a rotor 76, a stator casing 78, and a plurality of previously-described and circumferentially-arrayed hybrid seal segments 10, 12, 14, 16, 18, and 20. As previously noted, FIG. 1 shows hybrid seal segment 10 circumferentially arrayed together with the five other identical hybrid seal segments 12, 14, 16, 18, and 20 to define the annular hybrid seal 22. The rotor 46 has a longitudinal axis 80 (which is superimposed on previously-described longitudinal axis 34). The casing 78 is generally coaxially aligned with the longitudinal axis 80, circumferentially surrounds and is radially spaced apart from the rotor 76, and includes an inner circumferential groove 82 which is generally coaxially aligned with and open to the rotor 76. The mounting block 30 has a radially outer portion 84 which is engaged in the groove 82 of the stator casing 78. The first circumferential end 48 of the mounting block 30 of one 10 of two circumferentially-adjacent hybrid seal segments 10 and 12 circumferentially overlaps a portion of the first and second labyrinth-seal segments 86 (note that in FIG. 1, the first labyrinth-seal segment 86 is shown superimposed on the second labyrinth-seal segment which is hidden from view) of the other 12 of the two circumferentially-adjacent hybrid seal segments 10 and 12 and is circumferentially proximate the second circumferential end 88 of the mounting block 90 of the other 12 of the two circumferentially-adjacent hybrid seal segments 10 and 12.

The foregoing description of some embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A hybrid seal segment comprising:
    a) a first labyrinth-seal segment having a shape of generally an annular segment of a circular ring, having a longitudinal axis, and having at least one radially-inwardly-projecting and circumferentially-extending tooth;
    b) a second labyrinth-seal segment having a shape of generally an annular segment of a circular ring, generally coaxially-aligned with and axially spaced apart from said first labyrinth-seal segment, and having at least one radially-inwardly-projecting and circumferentially-extending tooth, wherein said first and second labyrinth-seal segments axially bound a circumferentially-extending channel therebetween;
    c) a mounting block disposed radially-outward from and attached to said first and second labyrinth-seal segments radially-outwardly bounding a circumferential portion of said channel, wherein said mounting block has opposing first and second circumferential ends, wherein said first circumferential end of said mounting block extends circumferentially beyond said first and second labyrinth-seal segments, and wherein said first and second labyrinth-seal segments extend circumferentially beyond said second circumferential end of said mounting block; and
    d) a brush-seal segment having a shape of generally an annular segment of a circular ring, generally coaxially aligned with said first and second labyrinth-seal segments, and having inwardly-extending bristles, wherein said brush-seal segment is disposed in said channel.

2. The hybrid seal segment of claim 1, wherein said first and second labyrinth-seal segments have generally the same inner and outer radii.

3. The hybrid seal segment of claim 2, wherein said first and second labyrinth-seal segments have generally the same circumferential length.

4. The hybrid seal segment of claim 3, wherein said first circumferential end of said mounting block extends a generally equal circumferential distance beyond said first and second labyrinth-seal segments, and wherein said first and second labyrinth-seal segments each extend generally said equal circumferential distance beyond said second circumferential end of said mounting block.

5. The hybrid seal segment of claim 4, wherein said first and second labyrinth-seal segments each have generally-radially-aligned circumferential ends.

6. The hybrid seal segment of claim 5, wherein each of said bristles of said brush-seal segment is aligned at generally a forty-five degree angle to a local radius line which extends from said longitudinal axis to each said bristle.

7. The hybrid seal segment of claim 6, wherein said first and second labyrinth-seal segments and said mounting block define a monolithic member.

8. The hybrid seal segment of claim 7, wherein said brush-seal segment is welded to said monolithic member.

9. The hybrid seal segment of claim 8, wherein said brush-seal segment has an axially-tapered circumferential end.

10. The hybrid seal segment of claim 8, wherein said channel proximate said second circumferential end of said mounting block axially widens with increasing radial distance from said longitudinal axis.

11. A rotary machine comprising:
    a) a rotor having a longitudinal axis;
    b) a stator casing generally coaxially aligned with said longitudinal axis, circumferentially surrounding and radially spaced apart from said rotor, and including an inner circumferential groove generally coaxially aligned with and open to said rotor;
    c) a plurality of circumferentially-arrayed hybrid seal segments each including:
        (1) a first labyrinth-seal segment having a shape of generally an annular segment of a circular ring, generally coaxially aligned with said longitudinal axis, and having at least one radially-inwardly-projecting and circumferentially-extending tooth;
        (2) a second labyrinth-seal segment having a shape of generally an annular segment of a circular ring, generally coaxially-aligned with and axially spaced apart from said first labyrinth-seal segment, and having at least one radially-inwardly-projecting and circumferentially-extending tooth, wherein said first and second labyrinth-seal segments axially bound a circumferentially-extending channel therebetween;
        (3) a mounting block disposed radially-outward from and attached to said first and second labyrinth-seal segments radially-outwardly bounding a circumferential portion of said channel, wherein said mounting block has opposing first and second circumferential ends, wherein said first circumferential end of said mounting block extends circumferentially beyond said first and second labyrinth-seal segments, wherein said first and second labyrinth-seal segments extend circumferentially beyond said second circumferential end of said mounting block, and wherein said mounting block has a radially outer portion which is engaged in said groove of said stator casing; and
        (4) a brush-seal segment having a shape of generally an annular segment of a circular ring, generally coaxially aligned with said first and second labyrinth-seal segments, and having inwardly-extending bristles, wherein said brush-seal segment is disposed in said channel; and
    wherein the first circumferential end of said mounting block of one of two circumferentially-adjacent hybrid seal segments circumferentially overlaps a portion of the first and second labyrinth-seal segments of the other of said two circumferentially-adjacent hybrid seal segments and is circumferentially proximate the second circumferential end of said mounting block of the other of said two circumferentially-adjacent hybrid seal segments.

12. The rotary machine of claim 11, wherein said first and second labyrinth-seal segments have generally the same inner and outer radii.

13. The rotary machine of claim 12, wherein said first and second labyrinth-seal segments have generally the same circumferential length.

14. The rotary machine of claim 13, wherein said first circumferential end of said mounting block extends a generally equal circumferential distance beyond said first and second labyrinth-seal segments, and wherein said first and second labyrinth-seal segments each extend generally said equal circumferential distance beyond said second circumferential end of said mounting block.

15. The rotary machine of claim 14, wherein said first and second labyrinth-seal segments each have generally-radially-aligned circumferential ends.

16. The rotary machine of claim 15, wherein each of said bristles of said brush-seal segment is aligned at generally a forty-five degree angle to a local radius line which extends from said longitudinal axis to said each bristle.

17. The rotary machine of claim 16, wherein said first and second labyrinth-seal segments and said mounting block define a monolithic member.

18. The rotary machine of claim 17, wherein said brush-seal segment is welded to said monolithic member.

19. The rotary machine of claim 18, wherein said brush-seal segment has an axially-tapered circumferential end.

20. The rotary machine of claim 18, wherein said channel proximate said second circumferential end of said mounting block axially widens with increasing radial distance from said longitudinal axis.

* * * * *